2,817,895

SOLDERING FLUX COMPOSITION AND METHOD OF SOLDERING WITH SAME

Ralph Chill, Mentor, and Tien-Shih Liu and Albert Yee, Cleveland, Ohio, assignors to Horizons Incorporated, Princeton, N. J., a corporation of New Jersey No Drawing. Application August 16, 1956
Serial No. 604,322

5 Claims. (Cl. 29—495)

This invention relates to a soldering flux. More particularly, it relates to a flux useful in the joining of members formed of aluminum alloys containing relatively large amounts of silicon to other metal members with or without the use of additional solder material. It is particularly concerned with the joining of alloys such as the alloy known in the trade as 13 alloy, having a nominal composition of between about 11 and 13% silicon, balance aluminum except for impurities as described on pages 824 and 825 of the 1948 edition of the Metals Handbook published by the American Society for Metals.

The joining of aluminum and of alloys consisting primarily of aluminum to one another and to other metals is complicated by a phenomenon which is characteristic of aluminum and aluminum base alloys, namely the formation of a thin and almost invisible coating of oxide on the metal on contact with the ordinary atmosphere or any other oxidizing environment. For reasons which we do not completely understand, this problem is particularly acute with aluminum alloys containing about 12% silicon, commonly used in the manufacture of die castings. To remove this oxide as a condition precedent to joining, a number of methods are known in the art, including treatment chemically by acids or alkalis, treatment physically by scratching, sandblasting or abrading, and treatment by various appropriate compositions which flux, melt, dissolve, or otherwise remove the oxide from the surface of the members to be joined. After cleaning, silicon containing aluminum alloys are usually coated with copper preparatory to joining them to other members. This invention is concerned with compositions which are useful in the preparation of joints involving silicon containing aluminum alloys without requiring the prior art preparational procedures.

Fluxes for removing the superficial film of oxide fall generally into different classes depending upon whether the joining is to be accomplished by welding, brazing or soldering. Welding or brazing are carried out at temperatures in the region of the melting point of one or both of the members being joined and the flux employed is required to possess stability and chemical activity at these elevated temperatures. For soldering, much lower temperatures are used and the flux composition must be one which is fluid at the lower temperatures and which possesses the necessary chemical activity or dissolving power to perform the desired removal of oxide. Because the temperatures for soldering differ so greatly from those encountered when brazing or welding, entirely different types of fluxes are required to accomplish the latter.

One type of flux which has been employed successfully for joining aluminum members in the past depends for its utility on the removal of the film of aluminum oxide by reaction or solution in one portion of the flux and the deposition of a "tinning" metal on the freshly exposed aluminum surface by reaction between the aluminum and another portion of the flux composition. Such fluxes are known as reaction type fluxes and include at least one compound of a metal which can be displaced from its compounds by the aluminum. Compounds of zinc, cadmium, tin, lead, antimony and bismuth, particularly their halides, are commonly employed as the reactive component of such fluxes.

Among the prior art reaction type fluxes developed for joining light metals are those described in United States Patents 2,299,164; 2,299,165; 2,299,166; 2,299,167 and 2,299,168 which issued October 20, 1942. The fluxes disclosed in these patents are based on a carrier or vehicle composed of any two or more of the chlorides of sodium, potassium and lithium together with minor amounts of fluorides and limited amounts of one or more halides of the metals below aluminum in the electromotive series. As disclosed in the patents, these fluxes are intended to be used with a brazing filler metal and are substantially different from the flux invented by us in both composition and the manner in which they are used. Our flux is characterized by the absence of any halides other than the chloride and by the presence of only a minor amount of alkali metal chlorides, proportioned so as to produce a composition having a melting point well below 500° C.

Another prior art flux is described in United States Patent 1,293,823 issued to George P. Luckey February 11, 1919. The specific flux therein described is formed by combining 65% of zinc chloride and 10% of ammonium chloride with 25% of a fused mixture of potassium chloride and sodium chloride in which the proportion of KCl:NaCl are those of their eutectic composition. The patentees also suggest that one or more of the chlorides of lithium, cadmium, copper, calcium, zinc, lead or ammonium may be combined with the eutectic mixture of KCl and NaCl.

We have found that a composition containing the chlorides of sodium and potassium and lithium proportioned within a specific relatively narrow range of proportions and the chlorides of zinc, lead, copper and cadmium in stated proportions is particularly suited to the joining of aluminum alloys, particularly those containing silicon.

In brief, flux compositions comprehended within our invention are those containing (a) about 10% by weight of the above noted three alkali metal chlorides in the following stated relative proportions:

NaCl _____ Between 5 and 25 mol percent or between 6 and 29 weight percent
KCl _____ Between 15 and 40 mol percent or between 21 and 43 weight percent
LiCl _____ Between 40 and 75 mol percent or between 29 and 66 weight percent the total being 100%; (b) about 83.5% zinc chloride and the remainder composed of (c) the chlorides of lead, copper and cadmium in the following proportions by weight:

| | Percent |
|---|---|
| $PbCl_2$ | 0.25–1.25 |
| CuCl | 4–6 |
| $CdCl_2$ | 0.5–1.75 |

In a more preferred composition in accordance with our invention the alkali metal chloride portion of our composition comprises a mixture of the three alkali metal chlorides in the relative proportions 10% NaCl, 36% KCl, 54% LiCl by weight.

In the use of our fluxes, we have found that the use of an additional solder material is entirely unnecessary to achieve a joint which is resistant to mechanical failure or chemical attack (e. g. corrosion) between alloys of aluminum containing up to 13% silicon, and other metals and alloys. The following examples will serve to further illustrate fluxes prepared in accordance with our invention.

Example 1

A flux composition was prepared by melting together 54 parts by weight of lithium chloride with 36 parts by weight of potassium chloride and 10 parts by weight of sodium chloride. Such a mixture corresponds to molar proportions of 66:25:9. The melt was allowed to cool and was then pulverized. To the pulverized composition which had a melting point of about 370° F. there was added zinc chloride, lead chloride, cuprous chloride and cadmium chloride in the proportions shown below:

| Sample No. | Parts by weight | | | | |
|---|---|---|---|---|---|
| | NaCl-KCl-LiCl Mixture | ZnCl₂ | CuCl | CdCl₂ | PbCl₂ |
| 421-3-4 | 10 | 83.5 | 5 | .5 | 1 |
| 421-3-3 | 10 | 83.5 | 5 | 1.5 | .25 |
| 342-73-3 | 10 | 83.5 | 6 | .5 | .5 |

The resulting mixtures had melting points in the vicinity of 450° F.–500° F., well below the temperatures at which they effectively reacted to cleanse the die cast alloy member being joined to another member. To effect such joints between 2S aluminum alloy and 13 alloy (11–13% Si, Al alloy), the members were positioned to form a horizontal joint. The several mixtures were individually tested by laying down the flux in powder form, at the joint and heating the assembly to about 725° F. At this temperature a clear melt formed with little or no fuming, and molten metal—probably zinc or a zinc-aluminum alloy containing some copper, lead and cadmium, formed at the joint. Usually this was accomplished after about one minute of heating when light gauge sheets were used. The salt film remaining after the joints had cooled was readily removed by warm water.

In order to evaluate the corrosion resistance of the joints made with the compositions of our invention, a test was designed in which butt joints of 2S aluminum alloy and 13 alloy (11–13% Si) were placed in a moisture chamber in which the atmosphere was saturated with water vapor maintained at 45° C., with a 5-pound weight hung on each test specimen (0.250 x .020 inch on cross section at joint). Thus the test determined the life of the joint under a minimum stress of about 1000 pounds per square inch. The results were as follows:

| Flux | Hours Before Failure |
|---|---|
| 421-3-4 | 1,053. |
| 421-3-3 | 1,053. |
| 342-73-3 | 1,053 (Failure in 2S above joint). |

Butt joints between the same alloys, prepared with other reaction type fluxes, lasted only a fraction of the time, generally considerably less than 60 hours before failure.

In a copending application filed jointly by one of the present applicants, namely Serial No. 604,336, filed August 16, 1956, there are disclosed flux compositions related to those hereinafter claimed.

We claim:

1. A soldering flux composition consisting essentially of about 10% by weight of a mixture consisting of the chlorides of lithium, sodium and potassium, in which the alkali metal chlorides are present in the relative proportions of LiCl between 29% and 66% by weight, NaCl between 6% and 29% by weight, and KCl between 21% and 43% by weight; about 83.5% by weight of the chloride of zinc; and the remaining 6.5% by weight consisting essentially of the chlorides of copper, lead and cadmium, in which the chloride of copper constitutes between 4% and 6% of the total weight of the composition, the chloride of lead constitutes between 0.25% and 1.25% of the weight of the composition, and the chloride of cadmium constitutes between 0.5% and 1.75% of the composition.

2. A soldering flux consisting of:

5.4% by weight of lithium chloride
3.6% by weight of potassium chloride
1.0% by weight of sodium chloride
83.5% by weight of zinc chloride and the remainder consisting essentially of the chlorides of copper, lead and cadmium in which the relative proportions of the chlorides of copper, lead and cadmium are between:

4% and 6% by weight of copper chloride
0.25% and 1.25% by weight of lead chloride
0.5% and 1.75% by weight of cadmium chloride 3. A soldering flux consisting of:

5.4% by weight of lithium chloride
3.6% by weight of potassium chloride
1.0% by weight of sodium chloride
83.5% by weight of zinc chloride and the remainder consisting essentially of the chlorides of copper, lead and cadmium in which the relative proportions of the chlorides of copper, lead and cadmium are:

5% by weight of copper chloride
1% by weight of lead chloride
0.5% by weight of cadmium chloride 4. A soldering flux consisting of:

5.4% by weight of lithium chloride
3.6% by weight of potassium chloride
1.0% by weight of sodium chloride
83.5% by weight of zinc chloride and the remainder consisting essentially of the chlorides of copper, lead and cadmium in which the relative proportions of the chlorides of copper, lead and cadmium are:

4.81% by weight of copper chloride
0.24% by weight of lead chloride
1.45% by weight of cadmium chloride 5. A method of joining at least two metallic members, at least one of which is composed of an aluminum base alloy having a silicon content of between 11% and 13% by weight, which comprises: assembling the metallic members to be joined with the joint in a substantially horizontal plane; applying to said members at said joint a composition consisting essentially of about 10 parts by weight of alkali metal chlorides in the following proportions: 5–29% NaCl, 21–61% KCl and 29–66% LiCl; about 83.5 parts by weight of zinc chloride and about 6.5 parts by weight of the chlorides of copper, lead and cadmium in the proportions of lead chloride between 0.25 and 1.25 parts by weight, copper chloride between 4 and 6 parts by weight and cadmium chloride between 0.5 and 1.75 parts by weight; heating the assembly and the composition to a temperature sufficient to melt the composition; heating the assembly and composition further to effect removal of the oxide on the surfaces of said metal members and reaction of said composition with the exposed metal of said members; discontinuing the further application of heat and, after the joint is cool, removing adherent salt by rinsing with water.

References Cited in the file of this patent

UNITED STATES PATENTS

| 2,179,258 | Howarth | Nov. 7, 1939 |
| 2,243,424 | Horowitz | May 27, 1941 |
| 2,723,928 | Fisher et al. | Nov. 15, 1955 |